(12) United States Patent  
Mall

(10) Patent No.: US 8,032,839 B2  
(45) Date of Patent: Oct. 4, 2011

(54) USER INTERFACE EXPERIENCE SYSTEM

(75) Inventor: Sanjeet Mall, Heidelberg (DE)

(73) Assignee: SAP AG, Walldorf (DE)

( * ) Notice: Subject to any disclaimer, the term of this patent is extended or adjusted under 35 U.S.C. 154(b) by 381 days.

(21) Appl. No.: 11/640,727

(22) Filed: Dec. 18, 2006

(65) Prior Publication Data

US 2008/0148150 A1 Jun. 19, 2008

(51) Int. Cl.
*G06F 3/048* (2006.01)
(52) U.S. Cl. .................. 715/811; 715/707; 715/789
(58) Field of Classification Search .......... 715/707, 715/789, 811
See application file for complete search history.

(56) References Cited

U.S. PATENT DOCUMENTS

| | | | |
|---|---|---|---|
| 7,454,386 B2 * | 11/2008 | Chakraborty | 706/12 |
| 7,620,894 B1 * | 11/2009 | Kahn | 715/707 |
| 2001/0049084 A1 * | 12/2001 | Mitry | 434/118 |
| 2005/0120313 A1 * | 6/2005 | Rudd et al. | 715/866 |
| 2007/0157093 A1 * | 7/2007 | Karcher | 715/707 |
| 2007/0243926 A1 * | 10/2007 | Cheng | 463/23 |
| 2009/0311657 A1 * | 12/2009 | Dodelson et al. | 434/350 |

* cited by examiner

*Primary Examiner* — Tuyetlien Tran
(74) *Attorney, Agent, or Firm* — Brake Hughes Bellermann LLP

(57) ABSTRACT

A method includes determining an initial experience-level of a user based on an initial usage of an application by the user, where the application includes a plurality of selectable features, selecting one or more first features from the selectable features to provide to the user, where the selected first features are based on the initial experience-level of the user, and providing a first user interface to the application to enable the user to utilize the first features. A subsequent experience-level of the user is determined based on the user's interactions with the one or more first features, one or more second features are selected from the selectable features to provide to the user, where the selected second features are based on the subsequent experience-level of the user, and a second user interface to the application is provided to enable the user to utilize the second features.

21 Claims, 4 Drawing Sheets

USER INTERFACE EXPERIENCE SYSTEM

TECHNICAL FIELD

This description relates to user interfaces.

BACKGROUND

As technological devices, such as, for example, computers, mobile phones, and personal digital assistants (PDAs), improve, so too do the capabilities of the applications and programs running on those devices. However, as is often the case, as the capability of an application increases, there may exist a corresponding increase in the complexity of the user interface associated with the application.

Thus, new users of an application may have a difficult time learning how to use the more complex user interface, while existing users, who have learned how to use the device with an older-generation, less complex user interface, may have less difficulty in learning how to use the new interface. In such situations, a new user just learning how to operate the application and being only interested in the basic functionality of the application nevertheless may have to operate the application off the same user interface as a more experienced user who may be more interested in the more advanced functionality of the application.

As such, not only may the new user may spend an undue amount of time trying to find only the basic functionality of the application that is of use to the user and filtering out all advanced features for which the user is not yet ready, but also the advanced user may spend extra time working around the basic functionality that the advanced user no longer needs.

Presenting a new user an advanced or complex user interface may not only be overwhelming to the user, but may also increase the time it takes to user to overcome the learning curve associated with the application and needlessly clutter the user interface with functionality not relevant to the user.

SUMMARY

In a first general aspect, a method includes determining an initial experience-level of a user based on an initial usage of an application by the user, where the application includes a plurality of selectable features, selecting one or more first features from the selectable features to provide to the user, where the selected first features are based on the initial experience-level of the user, and providing a first user interface to the application to enable the user to utilize the first features. A subsequent experience-level of the user is determined based on the user's interactions with the one or more first features, one or more second features are selected from the selectable features to provide to the user, where the selected second features are based on the subsequent experience-level of the user, and a second user interface to the application is provided to enable the user to utilize the second features.

In another general aspect, a computer program product can be used for adjusting features of an application based on an experience-level of a user, where the computer program product is tangibly embodied on a computer-readable medium and includes executable code that, when executed, is configured to cause a data processing apparatus to: select one or more features, associated with the application, to be provided to a user; provide a user interface associated with the application including the selected features; determine the experience-level based on the user's interaction with the selected features; and adjust the selected features based on the experience-level.

Implementations can include one or more of the following features. For example, the initial experience-level can characterizes the user's ability to operate and/or navigate the application when the user is relatively unfamiliar with the application, and the subsequent experience-level can characterizes the user's ability to operate and/or navigate the application when the user is relatively more familiar with the application. Determining the initial experience-level can include providing one or more queries to the user, receiving one or more responses to the one or more queries, and determining the initial experience-level of the user based the one or more responses.

Determining the subsequent experience-level can include providing a default set of the selectable features to the user, monitoring the user's usage of the default set of features over a time period, and determining an adjustment to the default set of features based on the initial usage. The plurality of selectable features can be configured to be turned on or off based on the user's experience-level, while the application remains operable. Providing the second user interface to the application can include notifying the user that a new interface to the application has been provided.

The method can also include (and, when executed, the code can cause the data processing apparatus to perform the step of) determining a third experience-level of the user based on the user's interactions with the one or more second features, selecting one or more third features from the selectable features to provide to the user, wherein the selected third features are based on the third experience-level of the user, and providing a third user interface to the application to enable the user to utilize the third features. Determining a subsequent experience-level can include determining a frequency and/or time of usage of the one or more first features, with respect to the user. Determining the subsequent experience-level can include making a comparison of the user's interactions with the one or more selected first features over a first time period to the user's interactions with the one or more selected first features over a second time period, and determining the subsequent experience-level based on the comparison. The application can be a customer resource management (CRM) application.

In another general aspect, a system can include a user interface configurable based on an initial experience-level associated with a user, a monitor configured to track the user's interactions with the user interface and further configured to determine a subsequent experience-level associated with the user based on the user's interactions, and a processor configured to adjust the user interface based on the subsequent experience-level.

Implementations can include one or more of the following features. For example, the monitor can be configured to determine the subsequent experience-level based on one or more categories of user interactions. The processor can be configured to adjust the user interface while the user is interacting with the user interface.

The details of one or more implementations are set forth in the accompanying drawings and the description below. Other features will be apparent from the description and drawings, and from the claims.

DETAILED DESCRIPTION

Figure 1:
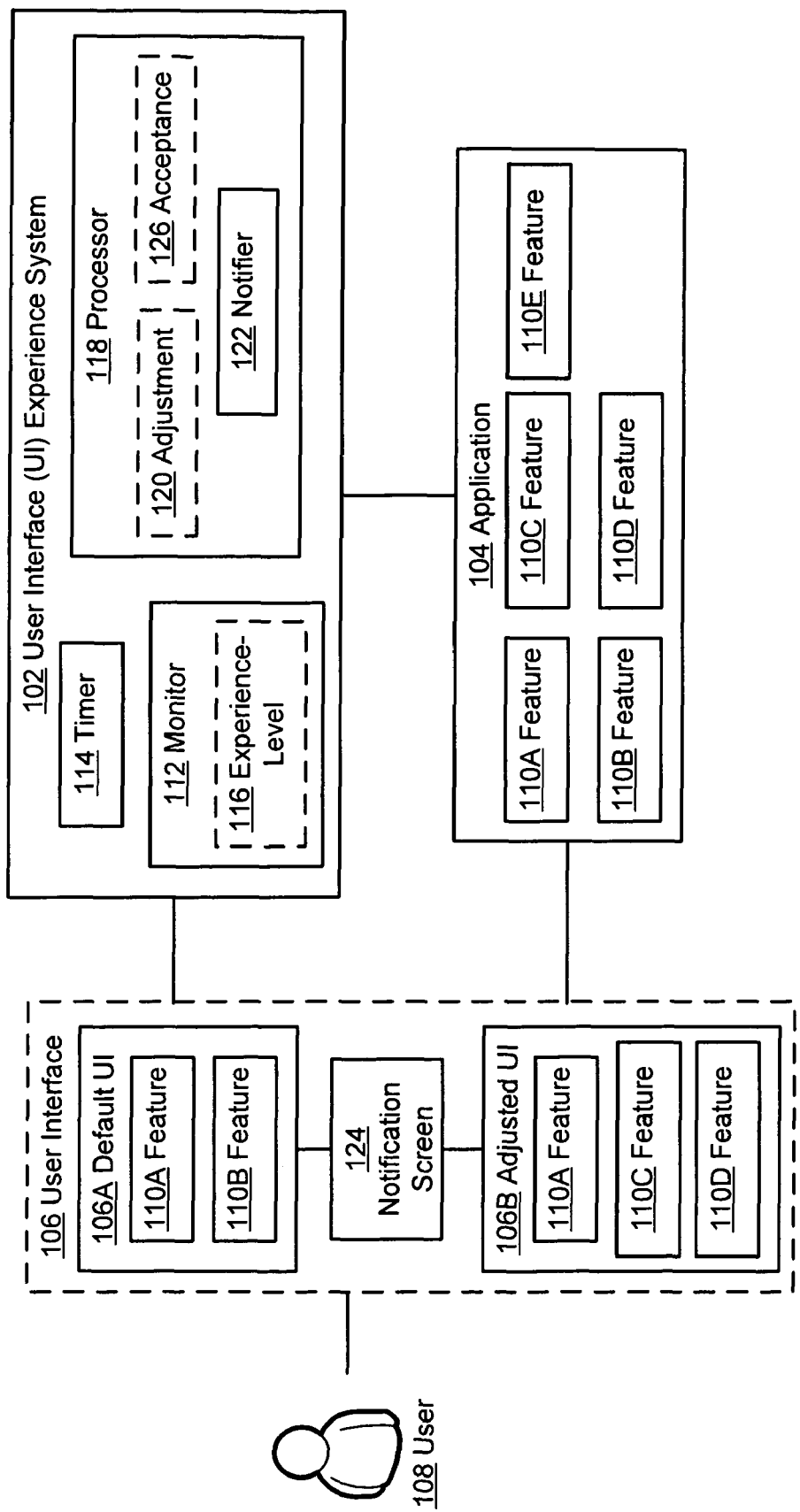
FIG. 1 is a block diagram of an example system for a user interface (UI) experience system, according to an example embodiment.

FIG. 1 is a block diagram of an example system 100 that includes an application 104, a user interface (UI) 106 associated with the application, and a user interface (UI) experience system 102 that can update the application 104 and or the UI 106. The system 100 can allow the user interface 106 and/or the application 104 to be updated and/or modified based on a user's experience or familiarity with the user interface 106 or the underlying application 104 associated with the user interface. For example, a user may log on to a default user interface 106, wherein the system 100 may assess the user's initial experience level and adjust the user interface accordingly, for example, based on the user's experience level. Then, for example, as the user gains experience and familiarity through interacting with the application 104 by way of the user interface 106, the user interface (UI) experience system 102 may monitor or track the user's interactions and further adjust the user interface 106 to better correspond to the user's abilities.

As just referenced, the user interface (UI) experience system 102 may track or monitor a user's level of experience or familiarity with an application 104 and adjust a user interface 106 associated with the application based on the user's experience. For example, the UI experience system 102 may track what tools or features of an application 104 are most often utilized by a user and the frequency of use of the various tools or features by a user. Then, for example, the UI experience system 102 may adjust the application 104 (and/or the user interface 106 associated with the application 104) based at least in part on the tracked usage.

The application 104 may include an application or program that interacts with one or more users through one or more user interfaces. The application 104 may be configurable, wherein the application 104 (or one or more user interfaces 106 associated with the application 104) may be adjusted based on a user's experience and/or skill level. For example, the application 104 may include core functionality that may be provided without respect to how much experience a user has with operating the application 104. The application 104 may also include, for example, features or components that are configurable based on the user's experience with the application 104. Then, for example, as the user gains skill and/or experience operating the application 104, the configurable features or components may be adjusted accordingly.

In an example embodiment, a user interface 106 associated with the application 104 may reflect the adjustment(s) made to the application 104 and/or directly to the user interface 106. The user interface 106 may be configured to provide at least a portion of functionality associated with a system or application. For example, the user interface 106 may provide selected features or tools associated with the application 104. The user interface 106 may include multiple screens between which a user may navigate. In an example embodiment, the user interface 106 may provide one or more basic features associated with the application 104. Then for example, as a user 108 gains experience with the application 104 and/or the user interface 106, the user interface 106 may be adjusted to account for the user's additional experience.

The user 108 may include any user or potential user of the application 104. For example, the user 108 may be an employee of a company who is using the application 104. The user 108 initially may be able to perform a relatively small number of tasks with the application 104, that the ability to perform these tasks be provided though a relatively simple user interface 106. Then, for example, as the user 108 becomes more familiar with the application 104 and is able to perform a greater number, variety, and/or complexity of tasks with the application 104, the user interface 106 may be adjusted to account for the user's 108 increased familiarity and dexterity with the application 104. In another example, the user 108 may gain experience and/or seniority in the company, and thus the user interface 106 may be adjusted to account for any additional and/or more complex tasks and responsibilities assigned to the user 108 due to the user's increased experience and/or change in status within the company. In an example embodiment, the additional features may be phased into the user interface 106 to allow the user 108 time to become adjusted to the added functionality.

According to an example embodiment, the user interface 106 may be configurable based on a user's familiarity with the application 104. For example, the application 104 may include various configurable features 110A, 110B, 110C, 110D, and 110E. The features 110A, 110B, 110C, 110D, and 110E may include features, tools, components or other aspects of the application 104 that may be adjusted to correspond to a user's familiarity or experience with the application 104. For example, the features 110A, 110B, 110C, 110D, and 110E may be configurable to be turned on or off, wherein their appearance on the user interface 106 may be based on whether they are 'on' or 'off'. For example, if the feature 110C is turned 'off' it may appear italicized or grayed-out on the user interface 106 wherein the user 108 cannot select it, or for example it may not appear on the user interface 106. The features 110A, 110B, 110C, 110D, and 110E may be represented within the user interface 106 as visual objects, such as buttons, menu items, or other visual icons which may be associated with the features 110A, 110B, 110C, 110D, and 110E. According to an example embodiment, the features 110A, 110B, 110C, 110D, and 110E may be adjusted, wherein the complexity associated with the features 110A, 110B, 110C, 110D, and 110E may be increased and/or decreased to correspond to the experience of the user 108.

In an example embodiment, when the application 104 begins, a default UI (user interface) 106A may be provided. The default UI 106A may include a user interface or screen configured to be provided to a new user of an application. For example, the default UI 106A may include any of the features 110A, 110B, 110C, 110D, and 110E that are determined to be provided when a new user accesses the application 104 through the user interface 106. According to an example embodiment, the default UI 106A may include the features 110A and 110B. According to an example embodiment, the features 110A and 110B may be included in the default UI 106A based at least in part on the rationale that the user 108 may need or desire the functionality associated with the features 110A and 110B when gaining familiarity with the application 104. Then, for example, the UI experience system 102 may monitor how the user 108 uses the application 104 with the default UI 106A (including the features 110A and 110B) and adjust the user interface 106 accordingly.

The monitor module 112 may monitor and/or track a user's interactions with an application. For example, the monitor module 112 may track the user's 108 interactions with the application 104 through the default UI 106A. Then, for example, the monitor module 112 may track what operations the user 108 performs and/or what features of the default UI 106A and/or the application 104 the user 108 uses. The monitor module 112 may track, for example, if, when, and for how long the user 108 uses the features 110A and 110B of the default UI 106A. According to an example embodiment, the monitor module 112 may record what operations the user 108 performs over a first period of time. Then, for example, the monitor module 112 may record what operations the user 108 performs over a second, later period of time. The monitor module 112 then may compare the two records to determine the user's 108 progression or experience with the application. In another example embodiment, the monitor module 112 may not only track what tasks the user 108 performs, but also may track how the user 108 goes about performing those tasks.

The monitor 112 may also track what other features (not shown) of the application 104 the user 108 uses. For example, the monitor 112 may track how many times the user 108 uses a help option of the application 104 or the default UI 106A, including how long the user 108 spends on a help screen.

The monitor 112 may operate in association with the timer 114. The timer 114 may be configured to time or otherwise determine how long it takes the user 108 to accomplish a task or a set of tasks. For example, the timer 114 may time how long it takes the user 108 to respond to a question presented by the user interface 106. In an example embodiment, the timer 114 may time how long it takes the user 108 to accomplish a task or a set of tasks on a first day. Then, for example, the timer 114 may time how long it takes the user to accomplish the same or similar task(s) on a second, later day. Then, for example, the monitor module 112 may take into account the time difference and/or any other time measurements as measured by the timer 114 in determining the experience-level 116 (or a change in the experience-level 116) of the user 108. For example, the speed with which a user performs a task or a series of tasks within the application 104 may serve as a measure of the user's experience or familiarity with the application, and therefore, when the time a user take to perform a task or a series of tasks drops below a threshold value, the UI experience system 102 may alter the UI to provide the user 108 with a different UI (e.g., with more features) that the default UI 106A that is provided to a new user of the application.

The experience-level 116 may include a measure of the level of experience or familiarity a user has in using an application and/or a user interface. For example, the experience-level 116 may include the level of experience the user 108 has with the application 104, based on the user's 108 interactions with the default UI 106A. In an example embodiment, the default UI 106A may be a query screen that asks the user 108 about the user's 108 experience, wherein the monitor module 112 may then determine the experience-level 116 based on the user's 108 responses. In another example embodiment, the monitor module 112 may track what features in addition to features 110A, 110B, 110C, 110D, and 110E the user 108 uses (that have been provided in the user interface 106), how long they are used for, the frequency of use, and the time it takes to accomplish one or more tasks to determine the experience-level 116. In another example embodiment, the experience-level 116 may be based on additional and/or different criteria.

According to an example embodiment, the experience-level 116 may be an experience level of a group of users that are grouped by experience. For example, the experience-level 116 may be an experience level for a novice, intermediate, or expert group of users. Then, for example, each group of users may be associated with a given set of metrics, for example, how long it takes the user 108 to complete a set of tasks that may be used to determine to which group the user 108 may belong. Then, for example, each group may be associated with one or more of the features 110A, 110B, 110C, 110D, and 110E associated with the application 104. A user 108 belonging to an intermediate group, for example, may be provided with a user interface 106 including the features 110A, 110B, 110C, 110D, and 110E associated with the intermediate group. In another example embodiment, the features 110A, 110B, 110C, 110D, and 110E provided to each user 108 may be determined on a user-by-user basis, wherein each user 108 may be evaluated to determine which features 110A, 110B, 110C, 110D, and 110E to provide to the user. Another example embodiment may incorporate aspects of the grouping by experience, the user-by-user basis, and/or additional or other ways to determine what features 110A, 110B, 110C, 110D, and 110E to provide to the user 108.

Then, for example, the processor 118 may adjust the user interface 106 to correspond to the experience-level 116. The processor 118 may adjust the application 104 and/or the user interface 106 based on the experience-level 116. For example, the processor 118 may modify the user interface 106 by adding, removing, or adjusting components of the application 104 that are presented to the user through the user interface 106. Based on the experience-level 116, the processor 118 may determine an adjustment 120 to make to the user interface 106.

The adjustment 120 may be an adjustment or modification to a user interface or an application based on a user's level of experience with the interface or the application. For example, based on the experience-level 116, the processor 118 may determine the adjustment 120. The adjustment 120 may include, for example, adding, removing, replacing, and/or otherwise adjusting the features 110A, 110B, 110C, 110D, and 110E to the user interface 106. For example, the user 108 may initially interact with the application 104 through the default UI 106A. Then, for example, the monitor module 112 may track the user's 108 interactions with the default UI 106A to determine the experience-level 116. Then, based on the experience-level 116, the processor 118 may for example determine the adjustment 120. The adjustment 120 may be, for example, to remove the feature 110B and add the features 110C and 110E.

The notifier 122 may notify a user of an adjustment or modification associated with a user interface or application with which the user interacts. For example, the notifier 122 may notify the user 108 before and/or after the adjustment 120 is made to the user interface 106. In another example embodiment, the notifier 122 may not provide notification to the user 108 about the adjustment 120.

The notifier 122 may communicate with the user 108 via the notification screen 124. The notification screen 124 may include an interface or a screen wherein a user is notified of an adjustment or modification that may be made or that has been made to a user interface. For example, the notification screen 124 may provide notice to the user 108 about the adjustment 120.

In an example embodiment, after receiving notice about the adjustment 120 via the notification screen 124 the user 108 may accept or reject the adjustment 120, in whole or in part, by responding via an acceptance 126. The acceptance 126 may include a user's response to the notification screen 124. The acceptance 126, for example, may provide information as to which parts of the adjustment 120 may have been accepted and/or rejected by the user 108. For example, the adjustment 120 may provide three changes to the user interface 106, and the user 108 may then, via the acceptance 126, accept two of the changes but reject the third. Then, for example, the processor 118 may adjust the user interface 106 by making the two accepted changes.

In another example embodiment, the processor 118 may determine the acceptance 126 after the user interface 106 has been adjusted based on the adjustment 120. Then, for example, if the user 108 rejects the adjustment 120 (or part of the adjustment 120) via the acceptance 126, the user interface 106 may be re-adjusted based on the acceptance 126, if necessary.

The adjusted UI 106B may include a user interface that has been adjusted based on the experience-level 116. For example, when the user 108 initially logs in to operate the application 104, the UI experience system 102 may provide the default UI 106A. Then, for example, the monitor module 112 may determine the experience-level 116, and based at least in part on the experience-level 116, the processor 118 may determine what adjustments (if any) to make to the default UI 106A. For example, the adjustment 120 may provide that, based on the experience-level 116, the feature 110B should be removed from the user interface 106, and the features 110C and D should be added. Then, for example, the user interface 106 may be adjusted based on the adjustment 120 and the adjusted UI 106B may be provided. Then, for example, the user 108 may provide the acceptance 126 of the changes, and the adjusted UI 106B may be further adjusted based on whether the user 108 accepted and/or rejected the adjustment 120.

In another example embodiment, prior to adjusting the user interface 106 based on the adjustment 120, the user 108 may provide the acceptance 126. Then, for example, the adjusted UI 106B may be provided based on which features the user 108 accepted via the acceptance 126.

Figure 2:
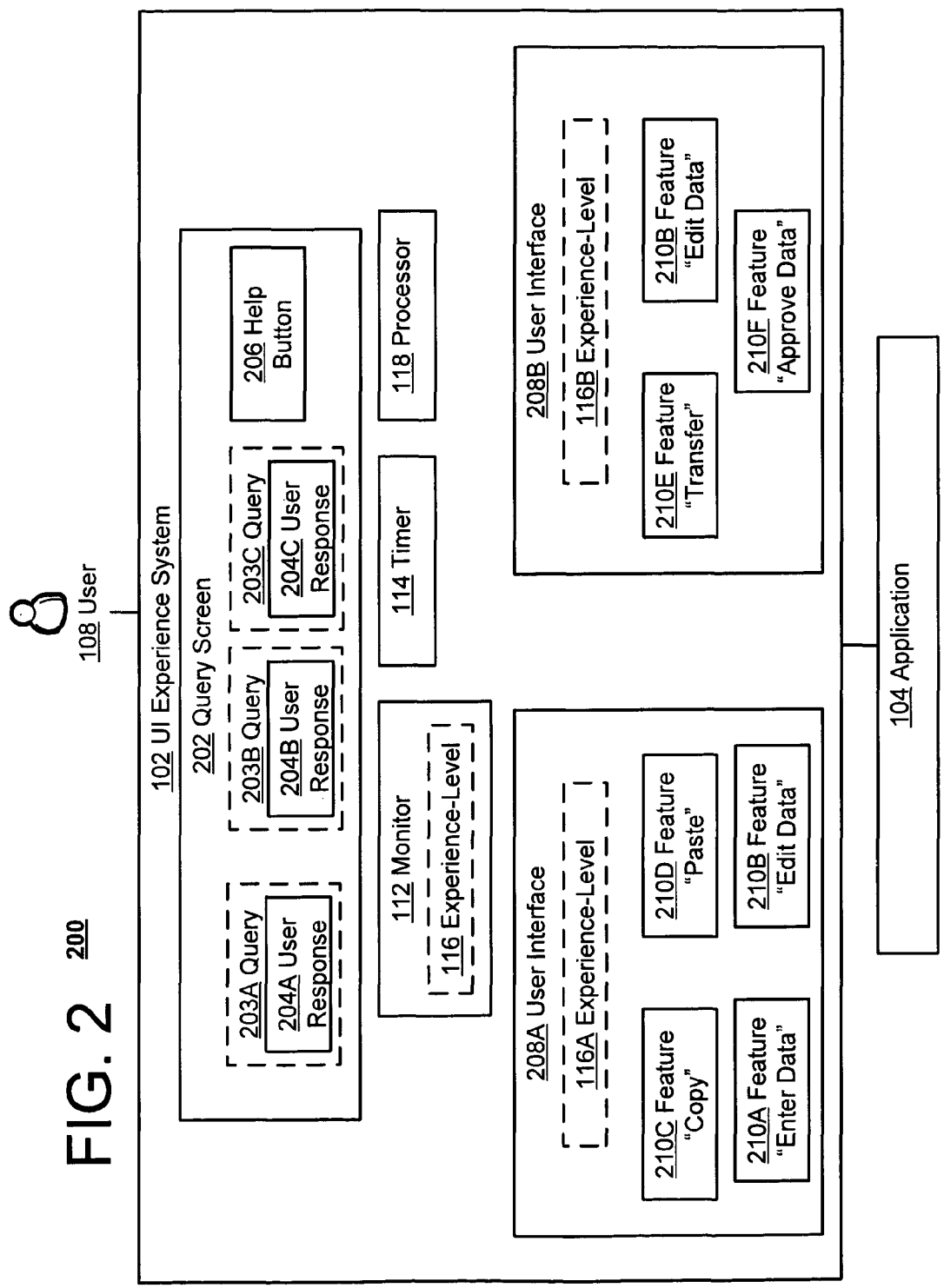
FIG. 2 is a block diagram of an example system for a user interface (UI) experience system according to an example embodiment.

FIG. 2 is a block diagram of an example system 200 for a user interface (UI) experience system according to an example embodiment. In the example of FIG. 2, the system 200 may include components that are similar or substantially similar to like numbered components of FIG. 1.

The user 108 of the application 104 may interact with the application 104 through the user interface (UI) experience system 102. The UI experience system 102 may, for example, provide a query screen 202. The query screen 202 may include an initial screen or another interface associated with the application 104.

The query screen 202 may include queries 203A, 203B, and 203C. The queries 203A, 203B, and 203C may be configured to require the user 108 to answer questions and/or fill in information prior to operating the application 104. For example, the query 203A and 203B may request the user 108 to enter a login id and password, respectively, allowing the UI experience system 102 to identify the user 108. Query 203C then for example may request the user 108 to select tools or tasks that the user will be performing with the application 104. Then, for example, the UI experience system 102 may retrieve an interaction history, including past usage of the application 104 by the user 108, and/or the UI experience system 102 may begin tracking the interactions between the user 108 and the application 104 based on responses 204A, 204B, and 204C to the queries 203A, 203B, and 203C.

In response to the queries 203A, 203B, and 203C, the user may provide user responses 204A, 204B, and 204C, respectively. The user responses 204A, 204B, and 204C may include responses to the query screen 202 as provided by the user 108. The user responses 204A, 204B, and 204C may include responses by way of text, radio buttons, check boxes, and/or another type of entry by the user 108. For example, continuing the example above, the user response 204A may include a username, the user response 204B may include a password, and the user response 204C may include check boxes, as selected by the user 108, associated with features or tools to be included on a user interface of the application 104.

In an example embodiment, the user 108 may not know how to respond to the query screen 202, in which case the user 108 may use a help button 206. The help button 206 may be a button, menu item, or other user interface component configured to assist the user 108 in responding to a screen or interface. For example, the help button 206 may assist the user 108 in providing the user responses 204A, 204B, and 204C. For example, the help button 206 may provide some or all of the user responses 204A, 204B, and 204C. In another example embodiment, the help button 206 may adjust a user interface or screen by adding or removing features. For example, the help button 206, if activated, may only provide the query 203A, rather the three queries 203A, 203B, and 203C. In another example embodiment, the help button 206 may provide the user 108 with instructions on how to operate the application 104 or response to the queries 203A, 203B, and 203C.

Based on the user responses 204A, 204B, and 204C and how often the help button 206 has been activated by the identified user 108, the monitor module 112 in association with the timer 114 may determine the experience-level 116 of the user 108. For example, the timer 114 may time how long it takes the user 108 to provide the user responses 204A, 204B, and 204C. Then, for example, the monitor module 112 may track whether and/or how many times the user 108 activated the help button 206, while the timer 114 may time for how long the help button 206 remained activated. Then, for example, based on the user responses 204A, 204B, and 204C, the timer 114, and the monitor's 112 tracking of the user's 108 interactions (i.e., requesting help 206), the monitor module 112 may determine the experience-level 116. According to an example embodiment, experience-level 116 may be based on previously stored information associated with the user 108. For example, the previously stored information may include operations, actions, and/or other information associated with a use of the application 104 by the user 108.

Then, for example, based on the experience-level 116, the processor 118 may determine which features and/or user interfaces to provide to the user 108. For example, the features 208A, 208B, 208C, 208D, 208E, and 208F may be associated with the application 104 (the features 208A, 208B, 208C, 208D, 208E, and 208F may be similar or substantially similar to the features 110A, 110B, 110C, 110D, and 110E of FIG. 1). The features 208A, 208B, 208C, 208D, 208E, and 208F may include features that may be selectable and/or configurable based on a user's familiarity or experience. Then, for example, based on the experience-level 116, the user 108 may be provided different combination(s) of the features 208A, 208B, 208C, 208D, 208E, and 208F as determined by the processor 118 and/or the application 104.

In another example embodiment, the application 104 may include predefined user interfaces that may correspond to varying experience-levels 116. For example, there may exist a novice user interface associated with a novice experience-level 116, an intermediate interface associated with an intermediate experience-level 116, and an expert interface associated with an expert experience-level 116. The novice user interface, for example, may include only those features or tools of the application 104 that are determined to be for novice users. According to another example embodiment, the novice user interface may then be further tailored based on an individual user 108, wherein features may be added, removed, and/or adjusted.

In an example embodiment, the application 104 may include a first user interface 208A and a second user interface 208B. The user interfaces 208A and 208B may include user interfaces adjusted or configured to be provided to users of varying experience-levels. For example, the user interfaces 208A and 208B may be associated with experience-levels 116A and 116B, respectively.

The user interface 208A may include features 210A, 210B, 210C, and 210D, and the user interface 208B may include features 210B, 210E, and 210F. The features 210A, 210B, 210C, 210D, 210E, and 210F may include features, tools, or other portions of the application 104 that may be configurable based on the experience-level 116. For example, the features 210A, 210B, 210C, and 210D may include features associated with the experience-level 116A. According to an example embodiment, the experience-level 116A may be associated with newer users of the application 104 (as compared to more experienced users having an experience-level 116B).

Then, for example, the features 210A, 210B, 210C, and 210D may be features or tools of the application 104 that may be used by the user 108 with the experience-level 116A and may be included in the user interface 208A. Then, for example, as the user 108 operates the application 104 via the user interface 108A, the monitor module 112, in association with the timer 114, may track the operations performed by the user 108, including the use of the features 210A, 210B, 210C, and 210D and the time spent on those operations. Then, for example, the monitor module 112 may determine, based on the tracked operations, that the user 108, who previously was associated with the experience-level 116A, has improved to the experience-level 116B.

Then, for example, the processor 118 may provide a predefined user interface 208B (in lieu of, or in addition to, the user interface 208A) to the user 108. The interface 208B may include features 210A, 210B, 210C, and 210D offered to the user via interface 208A as well as additional features, 210E and 210F. In another example embodiment, the application 104 may include only a single user interface having features 210A, 210B, 210C, 210D, 210E, and 210F that may be adjusted based on the experience-levels 116A and 116B.

The user interface 208A may include, for example, a feature 210A that allows the user 108 to enter data into the application 104, a feature 210B that allows the user 108 to edit data, and features 210C and 210D that allows the user 108 to copy and paste the data, respectively. Then, for example, the user interface 208B associated with a more experienced user than the user of the user interface 106A may replace the copy feature 210C and the paste feature 210D of the user interface 208A with the transfer feature 210E, which may perform the same functions as the combination of the copy 210C and paste 210D features. Also for example, both the user interfaces 208A and 208B may include the edit data feature 210B.

In an example embodiment, the user interface 208A may be associated with a user 108 who is an entry level user and who enters data into the application 104. Then, for example, as the user 108 gains experience with the application 104, the features may be adjusted with the increased experience-level 116 associated with the user. For example, the copy 210C and paste 210D features may be replaced with the transfer feature 210E). Then, for example, if the user 108 may be promoted within a company, the promotion may be accounted for by the UI experience system 102 and integrated into the experience-level 116. Then, for example, the user 108 may no longer require the enter data feature 210A and instead may require the approve data feature 210F.

Figure 3:
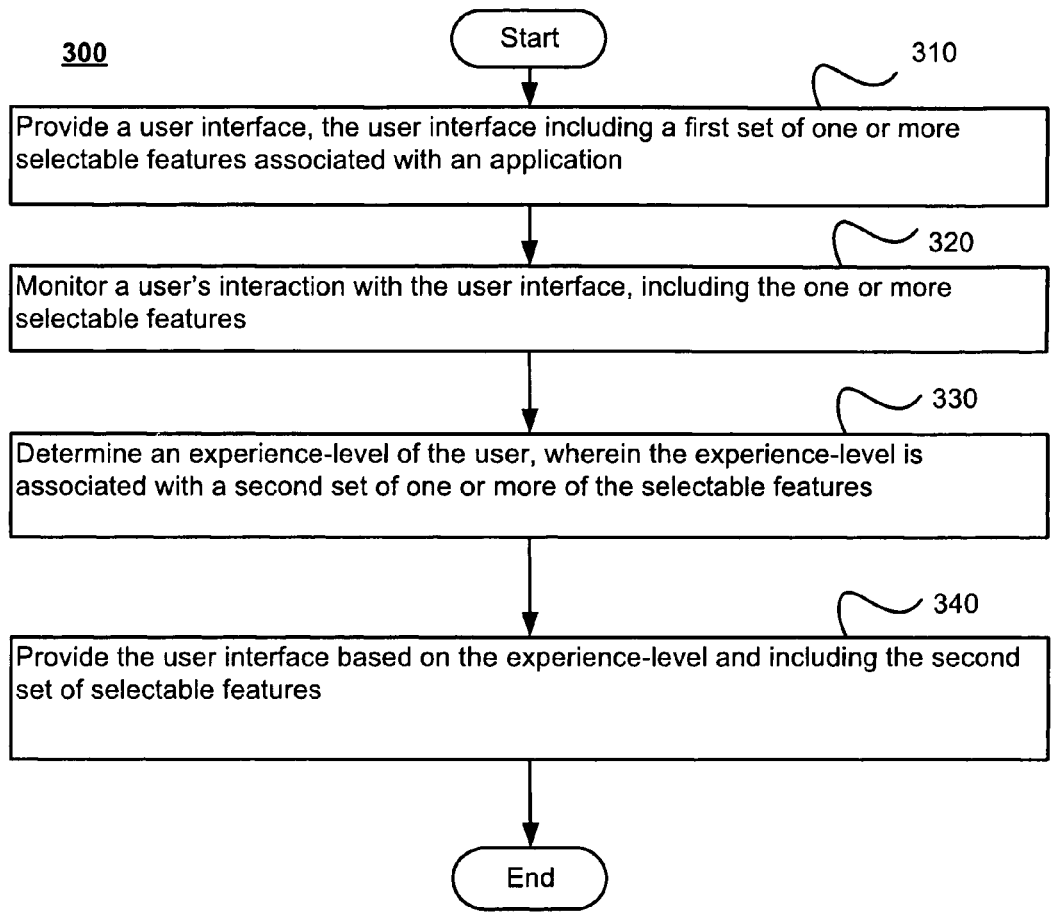
FIG. 3 is a flowchart illustrating example operations of the system of FIGS. 1 and 2.

FIG. 3 is a flowchart 300 illustrating example operations of the systems of FIGS. 1 and 2. More specifically, FIG. 3 illustrates an operational flow 300 representing example operations related to providing and implementing the UI (user interface) experience system 102.

After a start operation, a user interface may be provided, where the user interface includes a first set of one or more selectable features associated with an application (310). For example, as shown in FIG. 1, the UI experience system 102 may provide the default UI 106A associated with the application 104, which includes the features 110A and 110B.

Then, a user's interaction with the user interface, including the one or more selectable features may be monitored (320). For example, the monitor module 112 may monitor or track how the user 108 interacts with the default UI 106A that includes the features 110A and 110B.

Then, an experience-level of the user may be determined (330), where the experience-level is associated with a second set of one or more of the selectable features. In FIG. 2, for example, the monitor module 112 may determine the experience-level 116 of the user 108. The experience-level 116 for example may be either the experience-level 116A or 116B. The experience-level 116B may be, for example, associated with the features 210B, 210E, and 210F.

Then, another user interface may be provided (340), where the user interface is based on the experience-level and includes the second set of selectable features. For example, the user interface 208B may be provided, which includes the features 208B, 208E, and 208F associated with the experience-level 116B.

Figure 4:
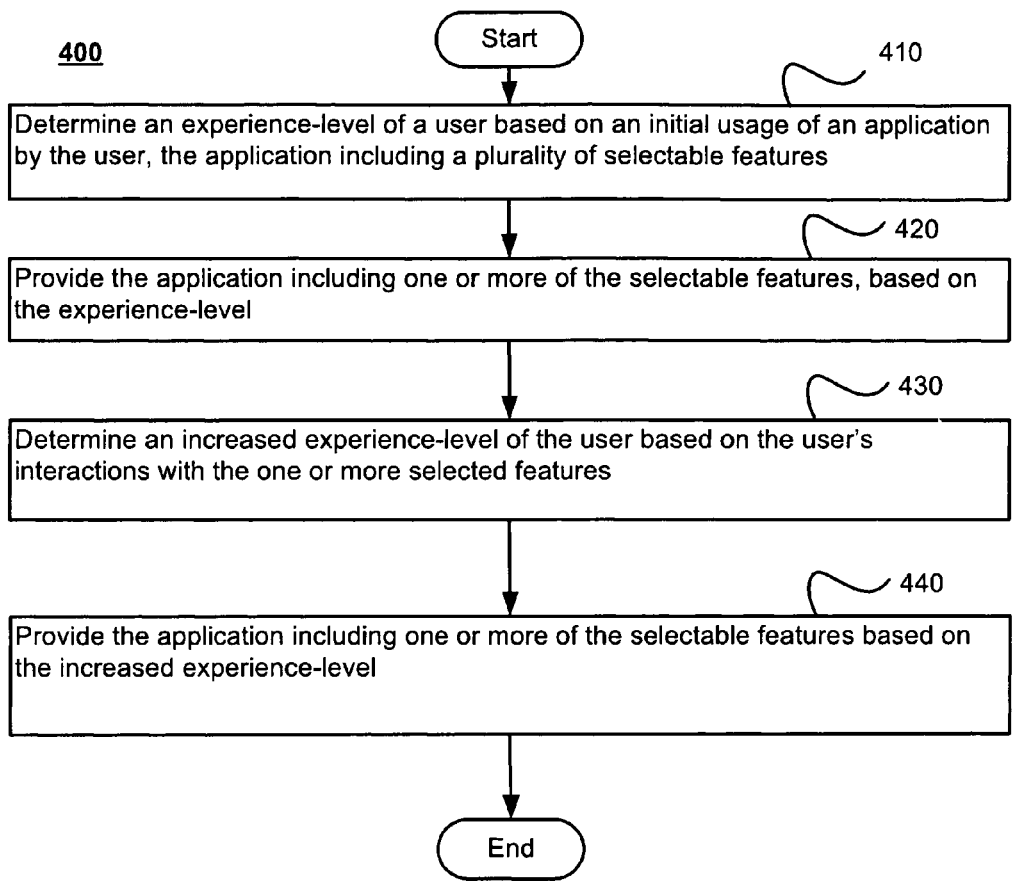
FIG. 4 is a flowchart illustrating example operations of the systems of FIGS. 1 and 2.

FIG. 4 is a flowchart 400 illustrating example operations of the systems of FIGS. 1 and 2. More specifically, FIG. 4 illustrates an operational flow 400 representing example operations related to providing and implementing the UI (user interface) experience system 102.

After a start operation, an experience-level of a user may be determined based on an initial usage of an application by the user, the application including a plurality of selectable features (410). For example, in FIG. 1, the experience-level 116 may be determined by the monitor module 112 based on the usage of the default UI 106A, including the features 110A and 110B.

The application, including one or more of the selectable features may be provided based on the determined experience-level (420). For example, in FIG. 1, based on the experience-level 116, the processor 118 may provide the default UI 106A that includes the features 110A and 110B to the user 108.

An increased experience-level of the user may be determined, based on the user's interactions with the one or more selected features (430). For example, as explained with reference to FIG. 2, the monitor module 112 may track how the user 108 operates the application 104 including the features 210A, 210B, 210C, and 210D in the user interface 208A. Then, for example, the monitor module 112 may determine that the experience-level 116 of the user 108 has increased from the experience-level 116A to the experience-level 116B.

Then, the application including one or more of the selectable features may be provided based on the increased experience-level (440). For example, as shown in FIG. 2, based on the experience-level 116B, the user interface 208B, including the features 210B, 208E, and 208F may be provided.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method, comprising:
   determining an initial experience-level of a user based on an amount of time it takes a user to perform a task associated with an application over a first period wherein the application includes a plurality of selectable features;
   selecting a plurality of first features from the selectable features to provide to the user based on the initial experience-level of the user;
   providing a first user interface to the application to enable the user to utilize the plurality of first features:
   determining an amount of time it takes a user to perform the task associated with the application over a second time period:
   determining a subsequent experience-level of the user based on a comparison of the amount of time it took the user to perform the task associated with the application over the first period of time and the amount of time it took the user to perform the task associated with the application over the second period of time:
   selecting a plurality of second features from the selectable features to provide to the user; based on the subsequent experience-level of the user and based on a changed status of the user:
   providing to the application a second user interface through which portions of the plurality of second features are phased-in to allow the user time to adjust to functionality of the plurality of second features; and
   replacing the plurality of first features with a third feature having functional equivalence to a combination of functions provided by the plurality of first features.

2. The method of claim 1,
   wherein the initial experience-level characterizes the user's ability to at least one of operate or navigate the application when the user is relatively unfamiliar with the application, and
   wherein the subsequent experience-level characterizes the user's ability to to at least one of operate or navigate the application when the user is relatively more familiar with the application.

3. The method of claim 1, wherein the selectable features are configured to be turned on or off based on the user's experience-level, while the application remains operable.

4. The method of claim 1, wherein providing the second user interface to the application includes notifying the user that a new interface to the application has been provided.

5. The method of claim 1, wherein the determining the subsequent experience-level includes:
   determining at least one of frequeney or time of usage of the plurality of first features with respect to the user.

6. The method of claim 1, wherein the plurality of second features are phased-in through the second user interface while the user is interacting with the second user interface.

7. The method of claim 1, wherein the replacing includes replacing the plurality of first features with the third feature based on the changed status of the user.

8. The method of claim 1, further comprising:
   removing at least a portion of the plurality of first features based on the changed status of the user.

9. The method of claim 1, further comprising:
   determining that the user has activated a help button associated with the application, the selecting of the plurality of second features is based on the determining that the user has activated the help button.

10. The methods of claim 1, further comprising:
monitoring interactions of the user with a help button associated with the first user interface, the plurality of second features is selected based on the monitoring of the interactions of the user with the help button.

11. The method of claim 1, further comprising:
monitoring interactions of the user with a help button associated with the first user interface, the subsequent experience-level of the user is determined based on the monitoring of the interactions of the user with the help button.

12. A computer program product embodied on a non-transitory computer-readable storage device and including executable code that when executed, is configured to cause a processor to:
determine an initial experience-level of a user based on an amount of time it takes a user to perform a task associated with an application over a first time period, wherein the application includes a plurality of Selectable features;
select a plurality of first features from the selectable features to provide to the user based on the initial experience-level of the user;
provide a first user interface to the application to enable the user to utilize the plurality of first features;
determine an amount of time it takes a user to perform the task associated with the application over a second time period;
determine a subsequent experience-level of the user based on a comparison of the amount of time it took the user to perform the task associated with the application over the first period of time and the amount of time it took the user to perform the task associated with the application over the second period of time;
select a plurality of second features from the selectable features to provide to the user based on the subsequent experience-level of the user and based on a changed status of the user;
provide, to the application, a second user interface through which portions of the plurality of second features are phased-in to allow the user time to adjust to functionality of the plurality of second features; and
replace the plurality of first features with a third feature having functional equivalence to a combination of functions provided by the plurality of first features.

13. The computer program product of claim 12,
wherein the initial experience-level characterizes the user's ability to at least one of operate or navigate the application when the user is relatively unfamiliar with the application, and
wherein the subsequent experience-level characterizes the user's ability to to at least one of operate or navigate the application when the user is relatively more familiar with the application.

14. The computer program product of claim 12, wherein the selectable features are configured to be turned on or off based on the user's experience-level while the application remains operable.

15. The computer program product of claim 12, wherein providing the second user interface to the application includes notifying the user that a new interface to the application has been provided.

16. The computer program product of claim 12, wherein the determining the subsequent experience-level includes:
determining at least one of a frequency or time of usage of the plurality of first features, with respect to the user.

17. The computer program product of claim 12, wherein the plurality of second features are phased-in through the second user interface while the user is interacting with the second user interlace.

18. The computer program product of claim 12, wherein the replacing includes replacing the plurality of first features with the third feature based on the changed status of the user.

19. The computer program product of claim 12, further comprising:
removing at least a portion of the plurality of first features based on the changed status of the user.

20. The computer program. product of claim 12, further comprising:
determining that the user has activated a help button associated with the application the selecting of the plurality of second features is based on the determining that the user has activated the help button.

21. The computer program product of claim 12, further comprising:
monitoring interactions of the user with a help button associated with the first user interface at least one of the plurality of second features is selected or the subsequent experience-level of the user is determined based on the monitoring of the interactions of the user with the help button.

* * * * *